March 5, 1935.  McFERRAN CROWE  1,992,993
DENTAL MATRIX RETAINER
Filed April 2, 1934
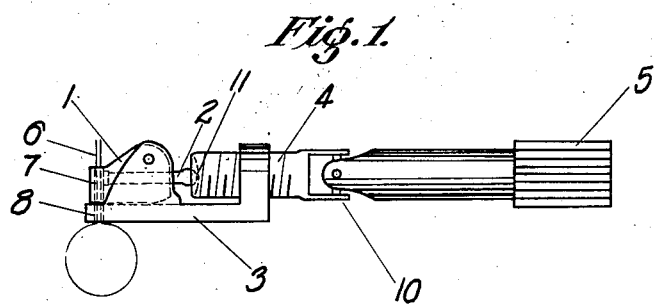
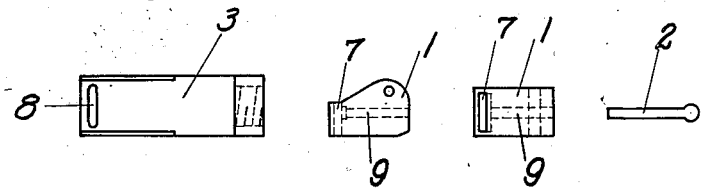
INVENTOR.

Patented Mar. 5, 1935

1,992,993

UNITED STATES PATENT OFFICE 1,992,993

DENTAL MATRIX RETAINER

McFerran Crowe, Lexington, Ky.

Application April 2, 1934, Serial No. 718,637

3 Claims. (Cl. 32—63)

My invention relates to improvements in dental matrix band retainers. A matrix band is a strip of thin, pliable metal, celluloid, or other suitable material, to be placed around a tooth which is to be filled. The objects of my invention are to provide a retainer for the band, of such length and size that it may be easily applied to, and removed from any tooth in the mouth, and to any position in the mouth, lingually, labially, and buccally, and be held firmly in place during the operation on the tooth. Also to so simplify the mechanism that only one screw is needed to clamp the band and tighten it around the tooth.

I accomplish these objects by constructing the mechanism illustrated in the accompanying drawing, which are oversize for convenience. It is unnecessary and not my intention to be arbitrary in regard to the size and shape of the different parts of the instrument, but to show clearly the principles involved.

Similar numerals refer to similar parts throughout the several figures in the drawing.

Figure 1 in the drawing is a plan view of the instrument with the band in place. Figure 2 is a top view of the base. Figure 3 is a side view of the drum. Figure 4 is a top view of the drum. Figure 5 is a plan view of the rod.

The base 3 is right angular in shape, having a long and a short extension, the latter being drilled and threaded to receive the screw 4. Near the end of the base opposite the angle, is a slot transversely placed. Standards rising from the sides of the long dimension of the base 3 support the drum 1, which is eccentrically pivoted between them. These standards may be spaced at any point between the slot and the short side of the base, or become an extension of the short side of the angle. Near the distal end of the drum is a slot 7 transversely placed, which is in direct apposition to the slot 8 in the base when the drum is seated and pivoted between the standards. This is a continuous slot in effect for the passage of the folded ends of the band, all of which is shown at 8, 7, and 6 in Fig. 1. Through the body of the drum 1 is provided a channel 9 beginning at the end opposite the slot 7 and communicating with the said slot, all of which is illustrated in Figs. 3 and 4.

The rod 2 illustrated in Fig. 5, has a ball at one end which enters a socket in screw 4, thereby joining the two parts by an ordinary ball and socket joint 11. In turn the screw 4 is connected by a universal joint 10 to the arm 5. The end of this arm 5 opposite to the joint is suitably enlarged and milled to facilitate the operation of the screw with the finger and thumb. The universal joint permits the operation of the screw with the arm 5 at different angles to the base 3. Turning the screw forward forces the rod 2 through the channel 9, which it fits loosely, and against the inner side of the slot 7, thereby forcing the drum outwardly and upwardly. The surface inside the slot 7 where the rod engages it, is grooved slightly to prevent the band from slipping when the force is applied. It will therefore readily be seen that when the loop in the band is placed around a tooth and the ends of the band are passed through the slots in the the base and drum, operating the screw raises the drum outwardly and upwardly, clamps the band and tightens it around the tooth at one and the same time. To remove the band from the tooth, the operation of the screw is reversed and the instrument is quickly removed from the mouth.

I claim:

1. The combination in a matrix band retainer of an angular base to rest against the side of a tooth, standards on said base, a drum eccentrically pivoted between said standards on said base, a channel extending longitudinally through the drum, slots transversely placed in the base and drum in apposition for the passage of the free ends of a band, a rod passing longitudinally through said channel in the drum to the slot, and means for moving the rod through the channel.

2. In a matrix band retainer, the combination of a base, having a transverse slot, a drum eccentrically pivoted to said base and having a longitudinally extending channel and a transverse slot intersecting said channel, a depression in a wall of the slot of the drum and in alignment with said channel, a band through the slots, a rod movable in said channel to clamp the band in the depression in the slot, and means for moving the rod longitudinally through the channel in the drum.

3. In a dental matrix retainer the combination of a base having an angular extension at one end and a transverse slot at the other end, a drum eccentrically pivoted to the base, said drum having a longitudinally extending channel therethrough and a transverse slot communicating therewith, a rod to move freely through said channel in the drum, a screw passing through a threaded hole in the short side of the base, and adapted to engage the end of said rod to force the same through the drum and engage a band in the slot, an arm extending backwardly connected to the rear end of said screw by a universal joint, the distal end of said arm being enlarged and milled for applying force to said screw with thumb and finger.

McFERRAN CROWE.